United States Patent [19]

Sheridan

[11] 4,437,511
[45] Mar. 20, 1984

[54] SOLAR ENERGY ABSORPTION AND DISTRIBUTION SYSTEM WITH FULL SOLAR, SOLAR ASSIST, AND FIREPLACE HEAT EXCHANGER MODES

[76] Inventor: John P. Sheridan, 5008 N. 35th St., Arlington, Va. 22207

[21] Appl. No.: 220,237

[22] Filed: Dec. 23, 1980

[51] Int. Cl.³ .......................................... F25B 29/00
[52] U.S. Cl. .................................. 165/485; 126/429
[58] Field of Search ................. 165/DIG. 2, DIG. 4, 165/2, 16, 485; 126/429; 237/8 R, 48; 236/1 G; 98/33 A

[56] References Cited

U.S. PATENT DOCUMENTS

| | | | |
|---|---|---|---|
| 2,304,103 | 7/1939 | Kelly | 236/1 D |
| 3,124,197 | 4/1953 | Funk | 165/DIG. 2 |
| 3,979,922 | 9/1976 | Shavit | 165/16 |
| 4,103,825 | 8/1978 | Zornig | 126/429 |
| 4,147,300 | 4/1979 | Milburn, Sr. | 126/427 |
| 4,176,709 | 12/1979 | Johnson | 165/DIG. 2 |
| 4,182,401 | 1/1980 | Pinnell et al. | 165/2 |
| 4,228,786 | 10/1980 | Frankenfield | 126/427 |
| 4,262,656 | 4/1981 | Esposito | 126/428 |
| 4,334,518 | 6/1982 | Ort | 237/8 R |

Primary Examiner—Albert J. Makay
Assistant Examiner—Henry Bennett
Attorney, Agent, or Firm—Dennis H. Lambert

[57] ABSTRACT

A heating and cooling system, which in the "heating" mode provides fresh, filtered, solar heated air which may be augmented by a fireplace(s) heat exchanger to selectively complement or supplant a heating system otherwise fueled by mass-purchased fossil fuels (oil, gas, coal, etc.), without resorting to intermediate steps, i.e., heat pump assist, liquid conversions, low level air mixing, etc. A collector duct extends along the peak region of an attic space to direct air, heated by solar energy impinging on the roof, to the intake of a heating and/or distribution system within the building. Vents admit outside air to the attic space, adjacent the eaves, so the air is heated by the hot roof and rises to the inlet slot of the duct in the peak region. The duct transfer can be closed and a further inlet opened to admit normal return air from the occupied areas to the heating and distribution system. In the absence of adequate solar heated air, a heat exchanger installed in a conventional fireplace may be selectively energized to perform a similar function. In the "cooling" mode, the system provides outside, cool air to the distribution system within the building, either in lieu of air normally cooled by the air-conditioning compressor, or as supply air thereto for normal cooling function.

3 Claims, 8 Drawing Figures

SOLAR ENERGY ABSORPTION AND DISTRIBUTION SYSTEM WITH FULL SOLAR, SOLAR ASSIST, AND FIREPLACE HEAT EXCHANGER MODES

BACKGROUND OF THE INVENTION

1. Field of the Invention:

This invention is in the field of energy recovering systems, particularly adapted for installation in existing buildings, with minor modifications. More specifically, the present invention is concerned with the utilization of solar energy in the heating of occupied areas of a building. Additionally, the use of outside cool air to cool or supplant cooling of the occupied areas of a building is contemplated by the present invention.

2. Prior Art:

Many, if not most, existing buildings are provided with a roof supported by rafters or a similar structure and a sheathing covered by shingles or the like. The roof usually encloses an attic space or other dead air space over the living or working quarters of the building. Solar energy impinging on the roof customarily heats the roof itself and the air in the attic space, and louvers are provided for circulation of outside air through that space to avoid excessive temperature rises during warm weather and to provide ventilation during cold weather. It has heretofore been customary to try to prevent such heating since the heat usually persists for many hours after sunset. In addition, the bottom wall of the attic or similar space usually constitutes the ceiling of the living or working quarters of the building, and much heat is lost therethrough to the air in the attic space. Due to the circulation through the louvers that heat is lost to the ambient outdoor atmosphere.

Attempts have been made heretofore to recover some of that heat and thus reduce the amount of fossil fuel energy it has been necessary to provided during the heating season. See, for example, the patent to Zornig No. 4,103,825. That patent proposes to utilize some of the solar energy trapped in an attic for heating the building, but involves considerable modification of the building structure, including the provision of a partition dividing the attic space into upper and lower plenum chambers. The patent also discloses a vent at the peak of the attic to vent unwanted heated air during the hot season.

SUMMARY OF THE INVENTION

The present invention is particularly adaptable to existing buildings and particularly homes having a conventional attic space and conventional fireplace(s). The invention comprises the provision of duct and control means for removing heated air from the peak portion of the attic chamber and distributing that air throughout the living quarters of the building during the heating season. The usual, existing exhaust louvers are closed during operation of this system. However, vents are provided for admitting fresh air from a region near the eaves of the building so that the air will move upwardly and become heated by the overlying roof to a maximum temperature in the peak or upper region of the attic. A duct extends from that upper region to the intake of a heating and distribution system, normally provided in the building, for circulation of the sun-heated air during periods of solar radiation and for a period of time thereafter until the attic air has become cool. Heat losses to the attic from the underlying space are thus recovered to a large degree and require less heating of the incoming fresh air to achieve the desired temperatures. Such heat losses normally occur, and the heat thus lost may be produced by electrical equipment within the building or from the warm air in the living or working areas.

When the temperature of the air in the attic plenum is too low for circulation of the air directly into the living quarters, industrially accepted as 77° F., a solar assist mode is put into operation. When this temperature is reached, controls effect closing of the duct leading from the attic plenum and opening of the normal cold air return so that normal return air from the occupied areas is fed to the heating system for heating thereby, and for distribution within the building.

Moreover, in the absence of adequate solar heated air, the fireplace heat exchanger may be energized. When suitable warm air becomes available from the fireplace heat exchanger, as supplied directly to the main blower, it is mixed simultaneously with the cool air from the normal return duct. In this mode, the furnace fossil fuel supply is automatically turned off and all solar mode controls are inactivated.

Conversely, during the cooling season, when the outside air temperature is less than the system return air temperature, controls automatically effect circulation of that outside air into the distribution system within the building. If the humidity level of this outside air is too high, the normal air conditioner compressor is activated, thereby removing the excess humidity. In many cases, the temperature of the outside air will be at a sufficiently low level that no further cooling thereof is required. In those cases when the outside air temperature is still too high for comfort, the normal air conditioning compressor is operated. However, when operating in this mode, the temperature of the outside air is still less than the normal system return air from within the building, and less energy is required to reach a comfortable temperature level.

A principal object of the invention is, therefore, to provide a solar assist for the conventional heating system in a dwelling, wherein the air normally heated in the attic of the building is circulated through the air distribution system of the building.

Another object of the invention is to provide a solar heating system for a building, wherein heated air normally lost to the atmosphere is recovered and used to heat the building.

A further object of the invention is to provide controls and ducts in a building with means to recover solar heated air whereby switching between conventional, full solar and solar assist modes is automatically accomplished in a manner to achieve maximum utilization of the solar heated air and to maintain a comfortable environment in the building with a minimum amount of effort and attention on the part of the occupants of the dwelling.

Yet another object of the invention is to provide a heating and cooling system for a building wherein solar heated air is used to supplant or augment conventionally heated air during the heating season, and outside air is used to supplant or augment the conventional cooling system of the building when the outside air is at a temperature less than the normal system return air.

BRIEF DESCRIPTION OF THE DRAWINGS

In the drawings, wherein like reference numerals indicate like parts throughout the several views, the preferred forms of the invention are illustrated, wherein.

DETAILED DESCRIPTION OF THE PREFERRED EMBODIMENTS

Figure 1:
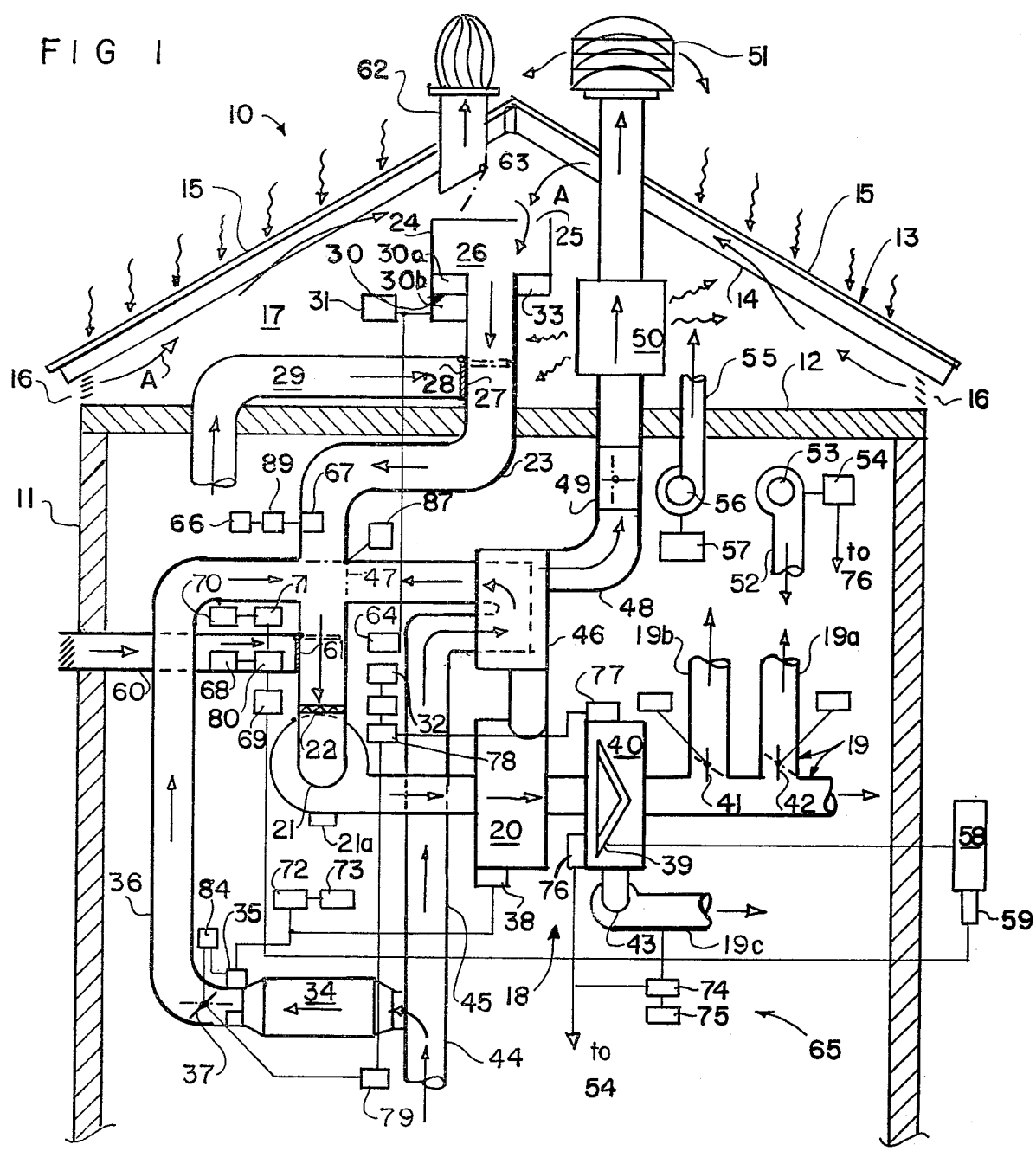
FIG. 1 is a diagrammatic view of the system in place in a dwelling, showing ducts, controls and heat exchangers, looking toward an end of the collector duct.
Figure 2:
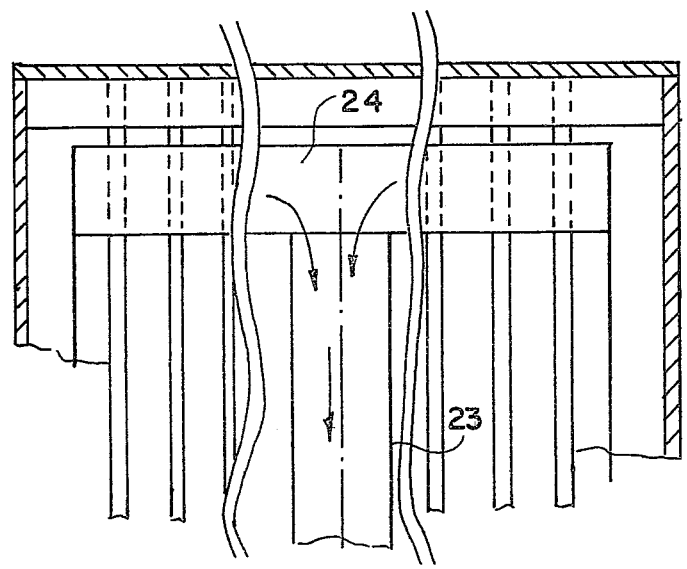
FIG. 2 is a somewhat schematic view, with portions broken away, looking toward the side of the collector duct.
Figure 3:
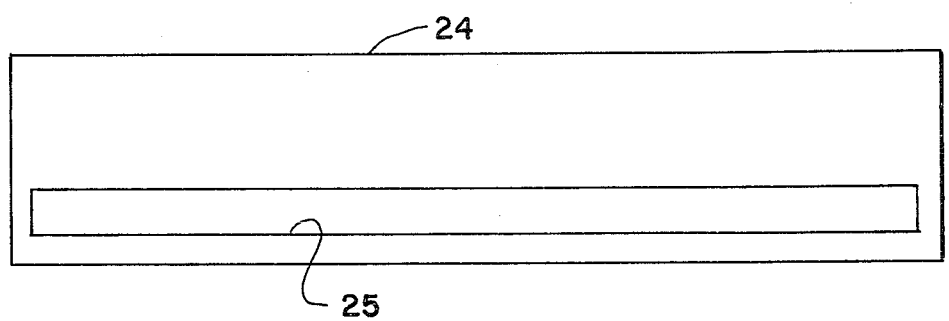
FIG. 3 is a top plan view of the collector duct.
Figure 4:
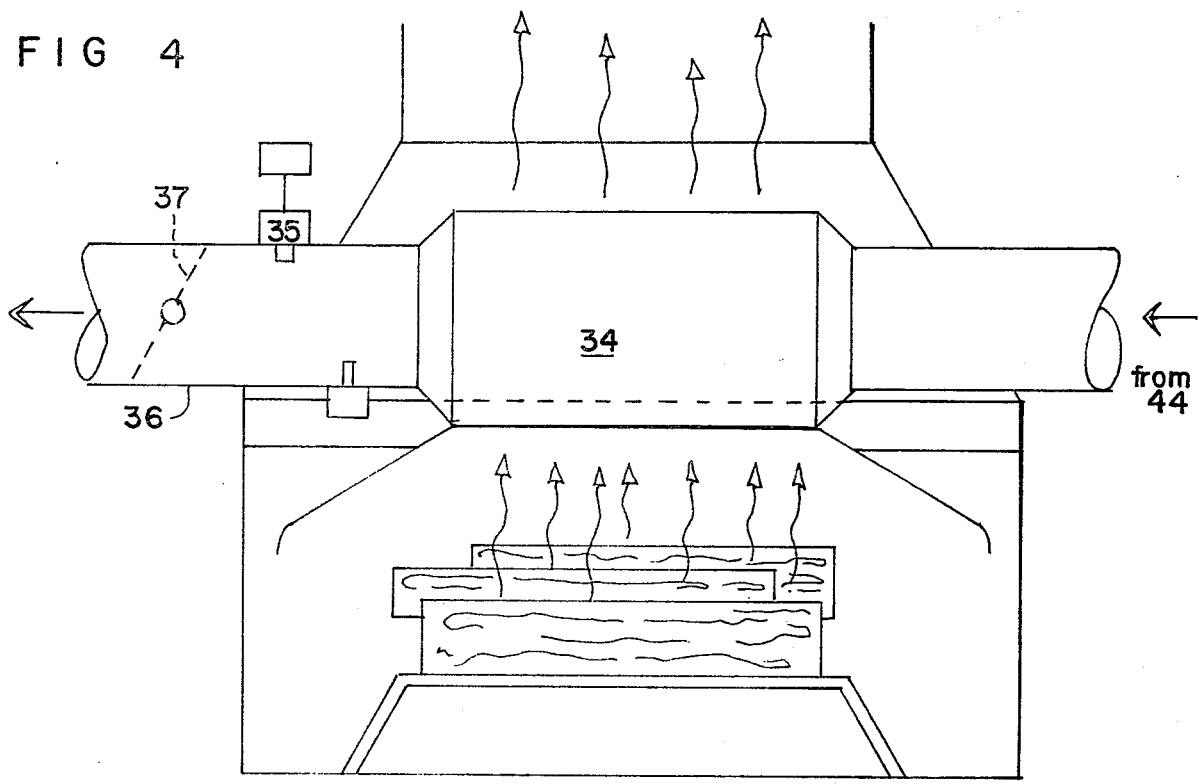
FIG. 4 is an enlarged, diagrammatic view of a fireplace with a fireplace heat exchanger therein in accordance with the invention, looking from the front of the fireplace.
Figure 5:
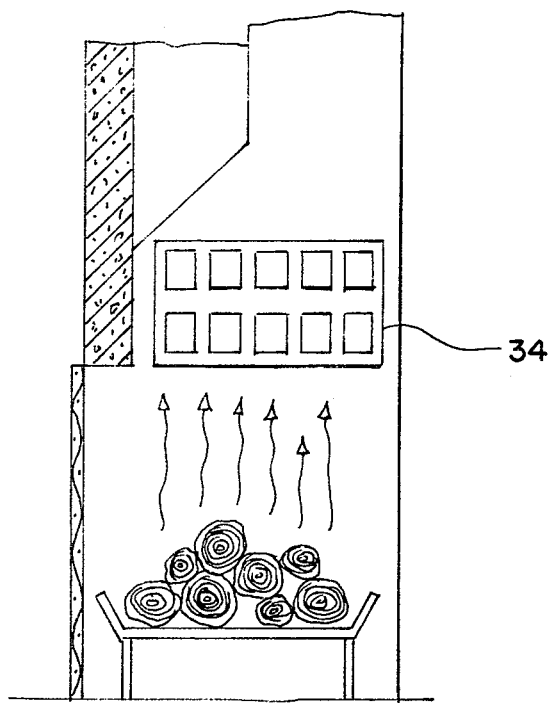
FIG. 5 is a side view in section of the fireplace and heat exchanger of FIG. 4.

A more or less conventional residence structure is schematically illustrated in FIG. 1 and is indicated generally at 10. The structure has side walls 11 and a ceiling structure 12 which is usually thermally insulated. Over the ceiling structure is a roof 13 comprising rafters 14 and a sheathing and shingle combination 15 supported by the rafters. In order for the present invention to be operable, it is preferable that the rafter construction be open, with no insulating material between the rafters and no interior sheathing covering the underside of the rafters. Success of the system is dependent on large volumes of air moving upwardly from apertures 16 at the eaves of the building, opening into the lower regions of the attic space, but closely adjacent the roof. Excess warmed air is naturally stored in plenum chamber or attic space 17, defined between the ceiling and roof.

Such structures are usually provided with vents or louvers at the peaks of the gables to provide air circulation through the attic space 17, but such are not shown in FIG. 1, since it is contemplated that they be closed during operation of the present invention.

As is apparent, outside air may enter the vents or apertures 16 at the eaves of the building and will be closely adjacent the underside of the hot roof 13. Assuming that solar energy is impinging on the roof, the roof will become heated and transfer much of its heat to the underlying air. That air will rise by convection, as indicated by arrows A, to an upper or peak region of the attic.

It is also assumed that the building or home illustrated includes a central heating system designated generally and schematically by reference numeral 18. The heating system comprises a distribution duct system 19 leading to different areas of the enclosure, a furnace or heater 20, and a forced air fan or blower 21 drawing air through a filter 22. Usually, the return of air through filter 22 is drawn from the interior of the building itself through return ducts from the different areas of the enclosure. However, in the present instance, as shown, additional return ducts are used to draw solar heated air into the distribution system. For example, a duct 23 extends from the attic space 17 to the main return duct system of the building air distribution ducting. The upper end of the duct 23 is connected with an inductor or collector 24 running along the peak of the attic space and having an opening or slot 25 extending along the top side thereof for drawing heated air from the upper portion of the attic space. The slot has a cross section which is twice the cross section of the inlet 26 to the duct 23, to insure that all of the highest temperature air is collected and induced toward inlet 26. The inductor 24 is positioned within a body of air that is at the maximum temperature in the attic. The duct 23 extends downwardly in any suitable manner to connect to the filter 22 at the intake of the heating system 18. A lateral inlet 27 is also provided in the duct 23, but, during utilization of solar energy, the lateral inlet is closed by damper 28. The inlet 27 is connected with normal air return duct 29. It may be noted that in a recent article in Business Week, Dec. 24, 1979, page 66, both EPA and DOE are reported as seriously concerned about indoor air pollutants, such as nitrogen oxides and carbon monoxide, mainly from pilot lights on stoves, water heaters, and other appliances. These pollutants accumulate when homeowners heavily insulate and recycle the air in a closed system. The system of the present invention introduces sufficient outside air to adequately prevent this situation, and this air passes through the electronic air cleaner or filter 22 as an element of the system.

Introducing outside air via apertures 16 and intake 26 to main blower 21 with damper 28 in a closed position in relation to normal air return duct 29 tends to create a positive pressure in the living areas being so heated. This is an additional feature of the system, whereby "used" or "stale" air is naturally expelled from the closed system by the myriad apertures to be found in any heated structure. The entrance of external colder air is also precluded by this phenomenon.

The damper 28 may also be positioned in a closed position relative to inlet 26 from inductor 24, whereby normal return air from the enclosure is returned and recycled through the distribution system by the blower 21. Control of the position of the damper 28 will be later described.

A suitable temperature sensing and control device 30 is mounted in the attic space 17 closely adjacent the inlet 26 and slot 25, for sensing the temperature of the air in the upper or peak region of the attic, and when that temperature is sufficiently high, or above a first temperature range, i.e. 67° to 77° F., a signal is provided to a control member 31 to cause the same to close the normal air return duct 29 and open the duct 23 leading from inlet 26, and to deenergize the furnace. That same signal is directed to a control device or box 32 for the furnace 18 and initiates and maintains operation of the blower 21 to draw heated air from the region or space 17 through the filter 22 and deliver the same to the distribution duct system 19 leading to the living or work areas of the building.

When the sensing means 30 determines that the temperature in the peak region of attic space 17 is below that which would be useful for directly heating the enclosure, i.e. below the first temperature range, the damper 28 is moved to block duct 23 and open duct 29 and the furnace is energized for conventional heating.

An analysis of long periods (30 to 60 days) of data indicates a potential enhancement mode wherein the air return temperature from occupied areas, normally fed via duct 29 to the main system blower 21 and furnace 18 for reheating, is frequently below the temperature at the solar inductor intake 26, and slot 25. If the temperature at the intake 26 is in the first range, i.e. 67° to 77° F., an independent thermostat control 33 on the inductor 24 will channel the warmer attic plenum air via 23 to the main system blower intake for a higher efficiency conversion. Normal air return via 29 will be shut off by damper 28, as during full solar heating.

It has been found that the system described above stores solar generated heat for many hours beyond sunset, continuing the availability of the heated medium for quite some time during a heating season. See FIG. 8.

Obviously, less fossil fuel will be required to reach a given temperature if the incoming air entering blower 21 is preheated. This is also true if air from the living areas is preheated via a fireplace heat exchanger 34. In this case, a thermostat 35 on the outlet 36 from the fireplace heat exchanger 34 senses the rising temperature and actuates a damper 37 to open the damper and enable air to be circulated through the fireplace heat exchanger to be heated before being supplied to the main blower 21 for distribution through the system and to the living or working quarters. Thermostat 35 also causes a signal to be sent to shut off fossil fuel valve or similar means 38 on the furnace 18. Also, the blower 21 is caused to operate at high speed to take full advantage of the heat transfer taking place in the fireplace heat exchanger 34. This blower speed is comparable to current air cooling system requirements, where a large volume of air movement through the "A" coil heat exchanger 39 in upper plenum 40 of the furnace/air-conditioner 18 is essential to system efficiency.

The speed of blower 21 will not be affected unless the temperature of air in the solar inductor 24, as sensed by thermostat 30, exceeds its preset, an arbitrary setting, depending on individual preferences for warmth, even though 77° F. is an accepted minimum due to the wind chill factor of the moving air emanating from registers fed by ducts 19. At this temperature, all fossil fuel is automatically shut off via sensing means 30, and the heating system is fed completely by solar heated air via inductor 24 and duct 23 from the attic space 17 as explained previously.

The distribution duct system 19 includes branch ducts 19a and 19b leading to the living area where the fireplace and fireplace heat exchanger 34 are located, for example, with dampers 41 and 42 therein to control flow therethrough to interrupt circulation of heated air to these living areas when the fireplace has a fire in it, since the heat from the fireplace is normally enough to maintain that or those rooms at a comfortable level.

In some instances, second zone heating and/or cooling may be desired, and second zone ducting 19c is provided for that purpose, with air being circulated through the second zone duct system by blower 43.

Air supplied to the fireplace heat exchanger 34 is obtained from the living area in which the fireplace is located, for example, and is conducted through duct 44. The fireplace heat exchanger is located in the duct 36 leading to the main furnace blower 21 from the duct 44, and a fireplace heat exchanger bypass duct 45 leads through a furnace flue heat exchanger 46 and thence to the main blower 21. A damper 47 is positioned at the juncture of bypass duct 45 and return duct 23 to the blower 21 for interrupting flow through the bypass duct and causing return air from the living area to be circulated through the fireplace heat exchanger 34.

The furnace flue 48 passes upwardly through the ceiling, attic space and roof to the outside atmosphere, and has a mechanical thermally actuated damper 49 therein which closes off when cold air is in the flue, thereby preventing such cold air from flowing downwardly through the flue into the living quarters.

A further flue gas heat exchanger 50 is located in the attic space 17, and radiates recovered heat from the flue gases into the attic space for heating the air therein prior to that air being drawn into and circulated through the distribution system via duct 23. A downdraft inhibiting cap 51 is provided on the upper end of flue 48.

Normally, the furnace, hot water heater and other heat generating devices are grouped together in a confined space, and in accordance with the present invention that heat is either recovered or exhausted from the building, depending upon whether heating or cooling of the enclosed area of the building is being accomplished. To this end, a duct 52 with associated blower and thermostatic control 54 is provided in the space to return the recovered heat to the living area. Additionally, a further duct 55 with associated blower 56 and thermostatic control 57 are provided in the confined space to vent the heat to the attic and thus to the atmosphere.

For cooling the building, an air conditioning compressor 58 is located outside the building, with a compressor relay 59 for turning the compressor on and off. To augment or supplant the compressor 58, a cold air duct 60 extends to the outside of the building and connects with the duct 23 in advance of the main furnace blower 21. Flow through this duct 60 is controlled by a damper 61.

A wind-operated vent 62 is extended through the roof 13 to vent hot air from the attic space 17 during the cooling season. A damper 63 is provided on the vent to prevent loss of hot air during the heating season.

Circulation of outside air through the duct 60 and distribution system of the building is accomplished whenever the outside air temperature is less than the system return air, regardless of humidity of such air. If the humidity of the outside air is excessive, the air conditioner compressor will be operated to remove the excess moisture. Substantial energy will be saved through the reduced temperature differential of air circulated through the furnace plenum "A" coil 39. It is not unusual for a substantial temperature differential to develop between the outside air and the system return air due to daytime structural temperature build-up, and the subsequent thermal lag. This is dramatically evident following a late afternoon or early evening thunderstorm, when outside ambients can drop twenty to thirty percent in a matter of minutes. The present invention takes immediate advantage of this phenomenon automatically, for a significant energy savings.

During both heating and air conditioning modes, a constant, low volume circulation of air through the system is maintained so that sensors can react to environmental changes. This moving air volume is automatically adjusted to accommodate changes in the controlling function.

When the heated attic space or plenum air is used as the sole heat source, in place of normal return air, a thermostat 64 functions as an automatic daytime set-up temperature control to bring the solar heated air from the attic space into the building interior during the sunrise - sunset period, in anticipation of the outside temperature drop after sunset. The solar energy impinging on the roof will restore the heat to the air in the attic space faster than it can be used. After sunrise, the air temperature at inductor 24 will begin to rise and will exceed the pre-set of thermostat 33 (approximately 65° F.). The damper 28 will then be automatically repositioned from the position with the normal return duct 29 open and solar duct 23 closed, to the position with normal return duct 29 closed and solar duct 23 open. During full solar heating (the temperature at thermostat 30 above 76° F., for example), the second zone will also rise to the "solar" thermostat preset via thermostat controls 65, which shut down the second zone blower 43 at temperatures above 78° F. (or other desired preset temperature).

Following sunset, many hours of heated air in attic space 17 will be available, with thermostats or sensors 30 and 33 shutting down the solar intake below the preset temperatures of sensors 30 and 33.

The heated attic plenum air may also be used as pre-heated air in place of the normal return air during operation of the furnace.

In the absence of adequate solar heated air in the attic space, the fireplace heat exchanger 34 can be operated to heat the building without the need for operating the furnace. For maximum efficiency, as air passing through the heat exchanger 34 reaches 78° F., as sensed by thermostat 35, it is automatically ducted to the main furnace blower 21, which at that time is on idle RPM. Upon reaching 85° F., the blower is automatically turned to high speed. As the fire dies down, the cycle is reversed. In other words, at 85° F. the blower speed is reduced, and when the temperature sensed by thermostat 35 reaches 77°-79° F., the damper 37 is closed. A difference between internal versus external temperature of 50° F. may be achieved with an average and not "roaring" fire in the fireplace. Thus, with an outside temperature of 20° F., an average inside temperature of 70° F. or above can be maintained.

As fuel for the fireplace, rolled newspapers are an excellent source since there is little smoke and almost no ash. Moreover, newspaper logs may be burned at the rate of 4 or 5 per hour to provide the heat as described above.

The furnace flue heat exchangers automatically extract about 50% of the energy normally wasted up the flue. This energy is used to pre-heat the normal system return air before it enters the system blower 21.

Further, as described previously, humidity of the circulated air is automatically controlled at all times, by the air conditioner compressor 58 during cooling season, for example, and by humidifier 66, controlled from humidistat 67, during heating season. A humidistat 68 is disposed in the cold air intake duct 60 to activate a relay 69 and deactivate the compressor relay 59 when the humidity of the incoming cool air is at an acceptable level.

An override switch 70 is connected with the actuator 71 for damper 61 to enable outside fresh air to be drawn into the building whenever it is desired to replace stale or musty air in the building.

An "alert" circuit 72 is connected with the thermostat 35 at the outlet of the fireplace heat exchanger 34 to energize a chime 73 when the temperature drops below a preset value, and a thermostat 74 and speed control 75 are associated with the duct 19c leading to the second zone, for controlling the speed of blower 43.

A thermostat 76 on the furnace plenum is connected with thermostat 74 and thermostat 54 to activate the second zone system and the heat recovery exhaust system 52, 53. A further thermostat 77 is on the furnace plenum and serves as a limiting sensor to deactivate fuel control 78 at the preset limit. The fuel control 78 is also controlled by a rotary switch 79 on the shaft of damper 37, and by the thermostat 30a on the collector or inductor 24.

Thermostat sensor 80 in the cold air duct 60 serves to determine when damper 61 is opened, and if damper 37 should remain closed.

Figure 6:
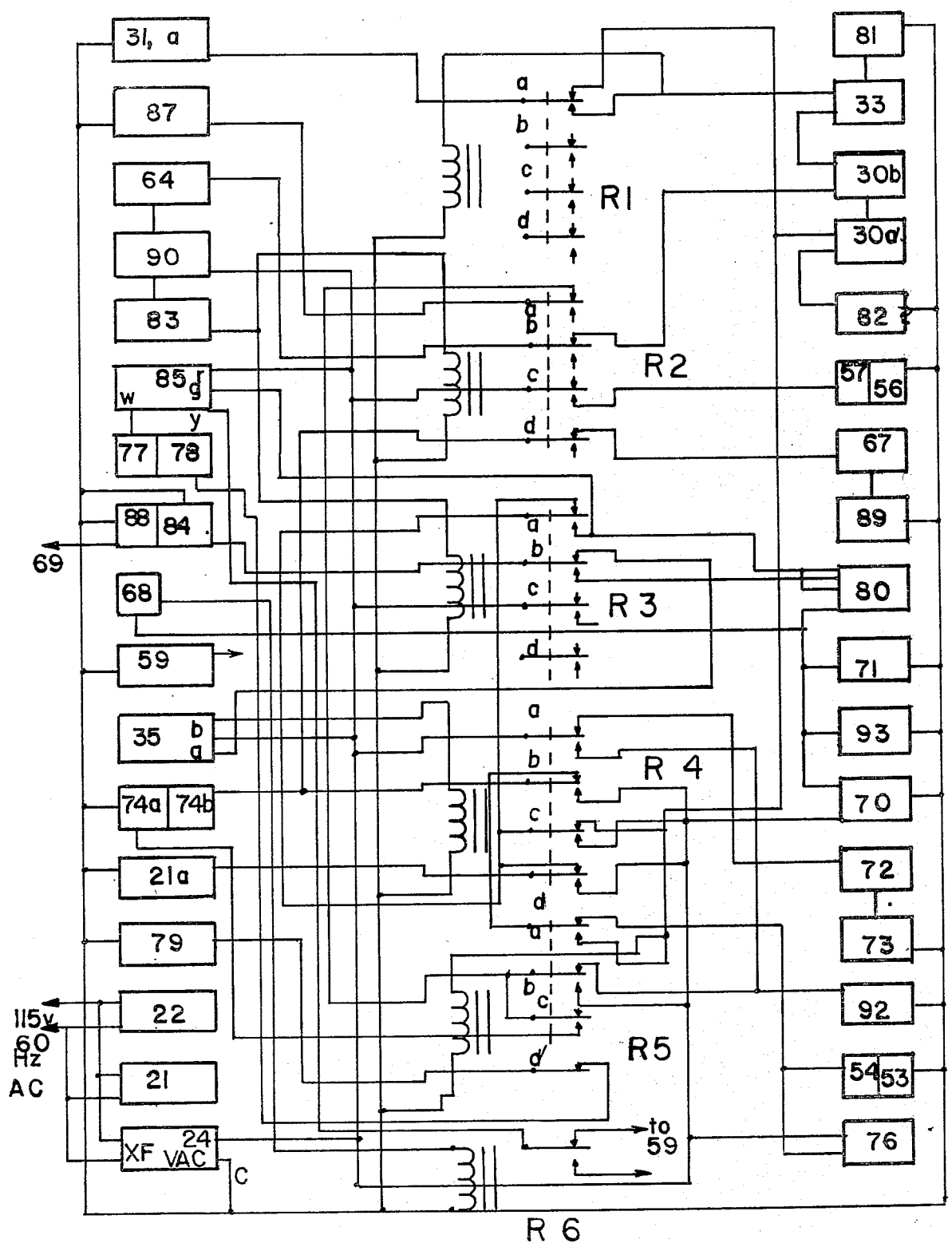
FIG. 6 is a schematic view of the electrical circuitry used in the control system of the invention.

Further details of the control system, and particularly of the circuitry involved, will be described in connection with FIG. 6. Basically, a plurality of thermostats, timers, switches, damper drives and relays are interconnected to achieve proper and automatic sequencing of the various components of the system of the invention. A first relay R1 is normally closed, with thermostat 30 above its preset. Activation of thermostat 33 closes the normally open contacts, so that when the temperature at 33 reaches 68° F., for example, relay R1 actuates, causing a timer 81 to begin counting time ON. Also, damper drive 31 actuates to move damper 28 to admit air from the attic space 17 to duct 23. When thermostat 30 reaches its preset, 77° F., for example, relay R1 is de-energized, damper 28 is actuated directly from thermostat 30a, timer 82 begins counting this temperature range ON, and timer 81 stops.

Relay R2 is normally closed when a HEAT or COOL switch 83 is open or on HEAT. However, when the switch 83 is moved to COOL, relay R2 activates and the normally open contacts are closed. Thus, when switch 83 is in the HEAT position, damper 47 will be closed if thermostat 30 is activated so that air from duct 44 is directly ducted to fireplace heat exchanger 34. However, if thermostat 30 is not activated, this circuit dead ends at relay R4a unless a fire is in the fireplace associated with the fireplace heat exchanger. The above circuit is through contact R2a.

Contact R2b of relay R2 connects thermostat 30 with thermostat 64 when the switch 83 is in the HEAT position, and opens the line between 30 and 64 when the switch is in the COOL position.

In the HEAT position, relay R2c is inactive, but in the COOL position, powers thermostat 57 to activate the furnace area exhaust, removing excess heat from that area.

Relay contact R2d powers humidistat 67 to operate the humidifier in the duct 23 when the switch is in the HEAT position; and when the switch is in the COOL position, interrupts power to the humidifier since the air conditioner compressor will then remove any excess humidity.

Relay R3 is normally unactuated and is closed in the HEAT position. When the switch 83 is moved to the COOL position, however, this relay activates in tandem with relay R2.

For the function of relay contact R3a, see the discussion following relative to relay contacts R4d and R4d. Contact R3b actuates damper drive 84 for damper 37 when thermostat 35 reaches its preset operating temperature. In the COOL position, damper drive 84 is actuated via the G terminal on the main thermostat 85, to provide increased air input via duct 44 and fireplace heat exchanger 34 for improved cooling efficiency. Of course, the fireplace does not have any fire in it at this time. A high speed relay 21a is simultaneously actuated if there is no fire under exchanger 34.

When the switch 83 is in the COOL position, relay R3c will enable thermostat 80 to actuate the outside air intake damper drive 71 for damper 61, shutting off the normal return of warmer air via return 29 and duct 23. Fresh outside air will thus be drawn into the system via duct 60, creating a slight positive pressure within the building. Stale air will be expelled via fireplace flues, exhaust openings and the innumerable cracks and crevices of the building. In the HEAT position, these circuits are inactive.

Relay R4 is normally closed when there is no fire under the fireplace heat exchanger 34, but with a fire, R4 activates via thermostat 35 to close the normally open contacts to "fire" position. In the "no fire" position, thermostat 35 has opened because the air through the fireplace heat exchanger 34 has reached the preset low temperature limit of 35. If "alert" switch 72 is ON, the fireplace chime circuit 73 will be activated, aurally indicating that additional fuel is required. Addition of fuel will re-activate thermostat 35, and contact R4a switches to the "fire" position, supplying 24VAC to flue drive (not shown) when used, starts the fireplace elapsed time indicator 86 and activates dampers 41 and 42 to close the registers in the room in which the fireplace is located.

When there is no fire, contact R4b closes the power supply circuit via relay R5 and thermostat 76 to second zone heating thermostat 74, and speed control 75 for blower 43. In the "fire" position, this relay connects the second zone controls (thermostat 74, speed control 75 and blower 43) directly to 24VAC bus.

Contact R4c, in the "no fire" position, directs the 24VAC bus from 30 at its preset temperature and above to the main blower 21 high speed relay 21a via contacts R3a and R4d. In the "fire" position, the main blower relay 21a is powered from 24VAC via either contact R4c or R4d.

Contact R4d, in the "no fire" position, completes the circuit from 30 to the main blower relay 21a when the system is in the HEAT mode. If the main thermostat 85 is in the COOL mode and a cool evening might require additional heating, a fire in the fireplace under the fireplace heat exchanger 34 will actuate thermostat 35 and activate the main blower 21 directly from 24VAC bus via contact R4d. When fuel to the furnace is normally off, the fireplace can be effectively used without switching back to HEAT.

Relay R5 is normally closed when the thermostat 30 is below its preset, and opens when 30 is above its preset temperature.

When thermostat 76 reaches its preset temperature, contact R4b "no fire" function will be in operation. When thermostat 30 reaches its preset temperature, the coil of relay R5 is activated, supplying power to main blower relay 21a via contacts R4c, R3a and R4d, assuming no fire under exchanger 34. The above is via contact R5a.

Contact R5b actuates the flue drive (not shown) when used if thermostat 30 is above its preset temperature and contact R2a is in the HEAT position. Warm air from duct 23 will then be fed directly to the intake of the main blower 21. Damper drive 87 for damper 47 will also be activated via contact R4a with a fire under exchanger 34, so that air entering 44 is directed to exchanger 34.

Contact R5d allows the fuel control 78 to be actuated via rotary switch 79 on the axis of damper 37, if the temperature at 35 is below the preset value. If this temperature is above its preset, this circuit is opened, turning off the fuel to the furnace 18.

When humidistat 68 registers below a preset relative humidity value, relay R6 opens the 24VAC bus line to the compressor relay 59, inactivating the compressor 58 and activating timer 88 for an elapsed time count.

The main thermostat 85 performs the normal function for a central thermostat controlling a heating and cooling system, and thermostat 64 is located physically adjacent thermostat 85 and effects closure of damper 28 when the temperature in the vicinity of main thermostat 85 equals the setting of 85. This prevents an excessive heating of the building beyond the setting of main thermostat 85.

The function of thermostats 76 and 77 on the plenum of furnace 18 has been described, but in summation, thermostat 76 closes on the preset temperature being reached (approximately 120° F.) to supply 24VAC to contact R5a. Thermostat 77 opens the fuel circuit 78 if the chamber temperature of 20 is excessive.

The thermostat 33 is a standard COOL thermostat with a preset temperature control and is normally open below the preset temperature (see contact R1a) and closes above the preset to actuate relay R1, powering the damper drive 31 to actuate damper 28 to close normal return duct 29, assuming the main thermostat calls for HEAT.

Thermostat 30 is a standard HEAT-COOL thermostat with preset temperature controls, and 30b being normally closed below the preset to allow 33 to function, 30a being simultaneously open. Upon a rise in temperature beyond the preset, 30b opens, 30a closes, furnace fuel is turned off and the main blower 21 switches to high speed operation via relay 21a, assuming that main thermostat 85 calls for HEAT.

The main blower 21 is solid state controlled, with a continuous idle RPM and speed controlled by furnace plenum temperature. The blower switches immediately to maximum RPM during COOL operation, when thermostat 30 is above its preset, or during operation via contacts R4d, R3a and R4c, if thermostat 35 is above its preset (fire in the fireplace).

The humidity control system includes a water valve 89 operated by humidistat 67, and the humidistat 68 in the cool air intake duct 60, which, with main thermostat 85 in its COOL position, monitors outside humidity when the preset of thermostat 80 is reached. At humidity levels below its preset, 24VAC is supplied to the coil of 69 to interrupt the compressor relay 59, shutting down the compressor.

Switch 90 in tandem with switch 83 activates thermostat 64 in the HEAT position, and relays R2 and R3 will be in their normally closed inactive states.

In the embodiment disclosed, there are three other timers or counters in addition to counters 82 and 88, discussed above. These include a counter 91 which counts the elapsed time during closure of 33; a counter 92 which counts the elapsed time during which 35 is actuated (heating via fireplace heat exchanger 34); and a counter 93 which measures the elapsed time during which the cool air intake 60 is open during COOL operation. As noted previously, timer 88 counts the elapsed time when counter 93 is running and the time during which the humidity of air entering 60 has a humidity level below the preset of 68.

The counters, relays, switches, dampers and damper drives, and other components of the system are commercially available items and details of construction are not believed to be important in this application. The arrangement and combination of elements functioning in the manner described herein is what is considered novel.

Figure 7:
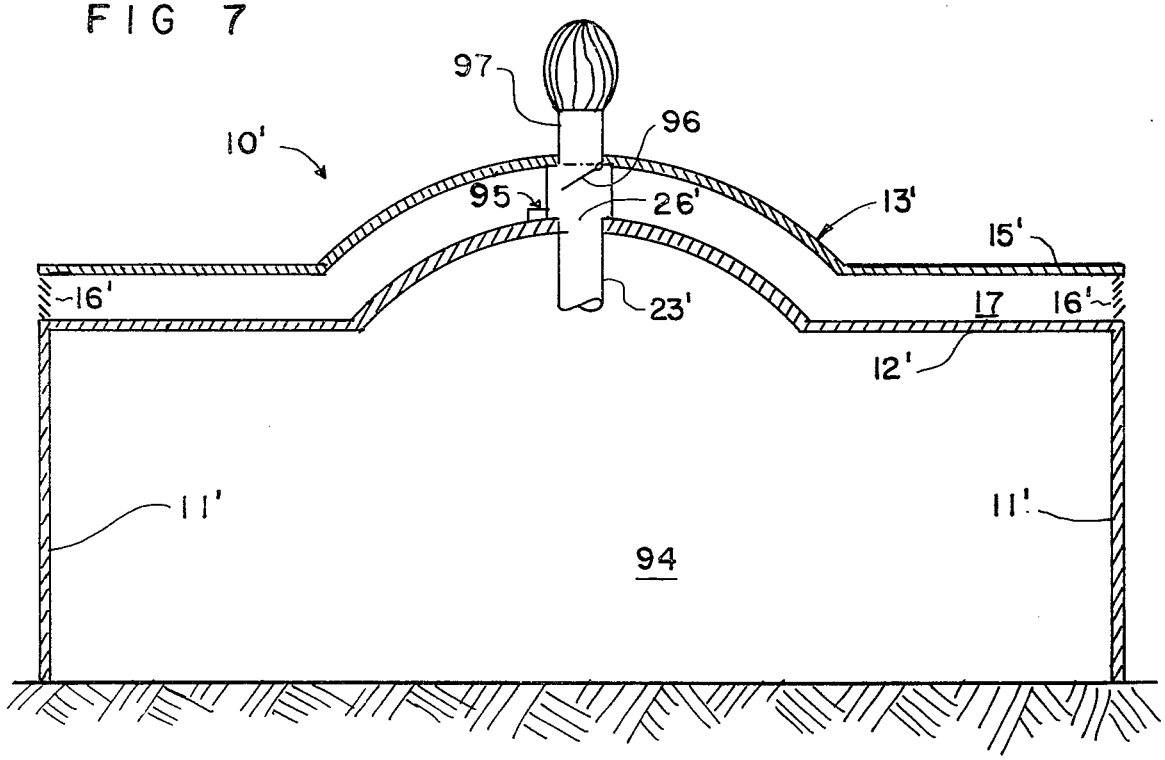
FIG. 7 is a view similar to FIG. 1, but showing a collector duct installed in the dead air space above the working quarters of an industrial or commercial building.

In FIG. 7, a commercial or industrial building 10' includes side walls 11' and a roof 13' with an inner ceiling or partition 12' and an outer roof 15' defining a dead air space 17 therebetween. Vents 16' admit air to the dead air space in the same manner as the vents 16 in the FIG. 1 embodiment. A duct 23' leads from the enclosed space 94 to a collector or solar inductor in the space 17', similarly to the duct 23 in FIG. 1, and thermostatic controls 95 function similarly to the controls 30 in FIG. 1. A duct system and controls are provided in the enclosed space 94 to control the distribution of heated or cooled air in accordance with the same principles as in the FIG. 1 embodiment. A damper 96 is positioned in the duct to block vent 97 leading to the atmosphere through the roof 15'.

Figure 8:
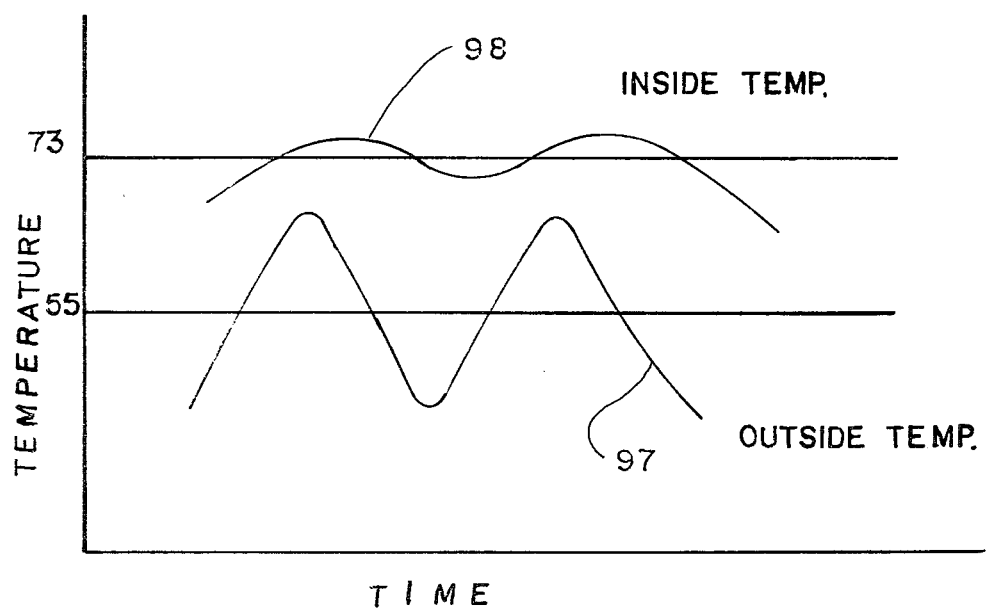
FIG. 8 is a graph showing a typical temperature differential which can be maintained between inside and outside temperatures when using the invention.

A graphic illustration of the extent of energy which can be usefully applied with the present invention is shown in FIG. 8, wherein the top curve 98 represents a typical interior temperature which can be maintained with the invention when the outside temperature ranges as shown by curve 97.

What is claimed as new and desired to be secured by Letters Patent of the United States is:

1. A system for controlling the environment in a building via a combination of air pre-heating and pre-cooling means automatically controlled and programmed by energy sensing devices integrated into a single system, said building having a roof exposed to solar radiation and forming the upper surface of a chamber containing a body of air which is heated by solar energy impinging on the roof, said roof and chamber configured to define an upper region of the chamber to which the solar heated air in the chamber rises, said system comprising:

a conventional heating and air conditioning system in the building, including a furnace with an evaporator, blower means, and air distribution and air return ducting leading to and from enclosed areas of the building;

an elongate collector duct in the upper region of the chamber extending lengthwise of the chamber and having a longitudinally extending slot therein for entry of the solar pre-heated air from the chamber into the collector duct;

a supply duct having an inlet connected with the collector duct for supplying solar pre-heated air to the air return ducting of the conventional heating system for distribution of the heated air to the enclosed areas;

said slot in the collector duct having a cross-section greater than the cross-section of the inlet to the supply duct to insure that all of the highest temperature air in the chamber is induced into the collector duct and thus the supply duct;

a blower in the ducting for drawing air from the chamber and through the collector duct and supply duct and forcing the air through the distribution ducting;

damper means at the juncture of the supply duct and conventional return ducting for selectively closing off flow from one of the supply duct and return ducting and opening the other to the blower; and thermostatically controlled means in the chamber and in the enclosed areas to (a) automatically operate the damper means to admit solar heated air from the chamber to the distribution ducting and to deenergize the furnace when the temperature of the solar heated air in the chamber is above a first predetermined value, (b) admit air from the conventional air return ducting while precluding flow of air from the collector duct and to energize the furnace when the temperature is below a second predetermined value, and (c) admit solar heated air from the chamber through the air return ducting directly to the furnace and to energize the furnace when the temperature of the solar heated air in the chamber is between said predetermined values.

2. A system as claimed in claim 1, wherein:

the conventional heating system includes a fireplace in the enclosed area;

a heat exchanger in the fireplace;

additional ducting leading from the enclosed area through the heat exchanger and to the return ducting for heating air with the fireplace heat exchanger when the fireplace has a fire in it; and damper means automatically controlled in response to automatic thermostatic sensors and controls to divert return air via the return ducting through the fireplace heat exchanger to heat the air either as a sole heating source or as a supplemental heating means to the conventional furnace and solar heated air.

3. A system as claimed in claim 2 wherein:

the conventional heating system includes an air conditioner cool air duct means leads from outside the enclosed areas of the building to the air return ducting; and automatically controlled damper means in the cool air duct means, responsive to automatic sensing controls to induct outside air of pre-selected temperature and humidity to enhance the efficiency of the conventional air conditioner and to expel accumulated stale air from within the conditioned areas via existing fireplace flues or other openings leading to the atmosphere.

* * * * *